United States Patent [19]

Berrier et al.

[11] Patent Number: 4,897,452

[45] Date of Patent: Jan. 30, 1990

[54] PROCESS FOR THE MANUFACTURE OF PROPYLENE HOMOPOLYMER OR COPOLYMER PELLETS

[75] Inventors: Bernard Berrier, Chateauneuf les Martigues; Jean-Claude Roustant, Lavera, both of France

[73] Assignee: BP Chemicals Limited, London, England

[21] Appl. No.: 176,103

[22] Filed: Mar. 31, 1988

[30] Foreign Application Priority Data

Apr. 7, 1987 [FR] France ............................. 87 04888

[51] Int. Cl.$^4$ ................................................ C08F 8/06
[52] U.S. Cl. ................................... 525/333.8; 525/387
[58] Field of Search ............................... 525/333.8, 387

[56] References Cited

U.S. PATENT DOCUMENTS 4,025,706 5/1977 Schober ......................... 525/333.8

FOREIGN PATENT DOCUMENTS 0123424 10/1984 European Pat. Off. .
1043082 9/1966 United Kingdom .

Primary Examiner—Joseph L. Schofer
Assistant Examiner—Bernard Lipman
Attorney, Agent, or Firm—Brooks Haidt Haffner & Delahunty

[57] ABSTRACT

The present invention relates to a process for the manufacture of propylene homopolymer or copolymer pellets in the presence of free radical generators so as to obtain non-sticky pellets with excellent reproducibility and to increase the melt index of the polymer during the pelletisation and of the subsequent conversion of the pellets into finished articles. The invention consists particularly in adding to the polymer two free radical generators, G1 and G2, the half-life of G2 being at least 20 times longer than that of G1 at the pelletisation temperature and in pelletising the polymer to which such addition has been made under conditions such that at least 80% by weight of G2 and not more than 20% by weight of G1 remains intact in the pellets and available for a subsequent decomposition during the conversion of the pellets into finished articles.

10 Claims, No Drawings

PROCESS FOR THE MANUFACTURE OF PROPYLENE HOMOPOLYMER OR COPOLYMER PELLETS

The present invention relates to an improved process for the manufacture of pellets of propylene homopolymers or copolymers, which process is carried out in the presence of free radical generators. In particular, this process makes it possible to obtain, under easy industrial conditions and with excellent reproducibility, tractable pellets comprising a propylene homopolymer or copolymer possessing a melt index which is relatively high and which is capable of being subsequently considerably increased during the conversion of the pellets into finished articles.

It is known that for certain applications, such as the manufacture of textile fibres intended for making nonwoven materials, the manufacture, by deep drawing, of components made of stampable reinforced thermoplastics (SRT), and also the manufacture of injection-moulded components at a high rate, use is made of propylene polymers which have a very high melt index and a crystallinity which can vary within a wide range. However, it is difficult to use a polymerization process to obtain directly polymers of a very high melt index because, due to their particular nature, such polymers can require complex and costly operations during their preparation primarily in relation to the use of solvents, especially operations of separating the polymers from the solvents in which they are prepared. Thus, it has been proposed to prepare propylene polymers with a relatively low melt index according to the usual polymerization processes and then to subject these polymers to a thermomechanical degradation treatment in the presence of a free radical generator, under such conditions that the melt index of these polymers increases to the desired value. In theory, during this treatment, the thermal decomposition of the free radical generator, such as a peroxide, can cause the macromolecular chains of the propylene polymer to break and thus the melt index of the polymer to increase.

It is known from French Patent Application No. 1377951 to carry out this thermomechanical degradation treatment in the presence of a free radical generator in an extruder, either during pelletisation of the polymer or during the conversion of the pellets into finished articles. However, when the intention is to produce finished articles consisting essentially of a propylene polymer with a very high melt index, it can be difficult to carry out this degradation treatment effectively. In fact, when the degradation treatment is carried out during pelletisation, the polymer leaving the extruder in the form of continuous filaments, becomes so fluid and so soft that it is difficult or even impossible to cut it into pellet form. Moreover, the pellets consisting of these polymers of very high melt index can be sticky and can tend to agglomerate, making handling difficult. The user of the pellets, i.e. the converter, is generally someone other than the manufacturer of the polymers and of the pellets. When the converter employs this degradation treatment during the conversion of the pellets into finished articles, he must modify and adapt the extruders and the conditions of their use, in order to effectively process each type of pellet. In particular, he must equip the extruders with a device for introducing and metering the free radical generator, while satisfying safety constrainsts due to the thermal instability of these materials. It has been observed that when this degradation treatment is carried out with a polymer which is not in the form of a powder but in the form of pellets, the dispersion of the free radical generator in the polymer may be relatively more difficult and the lack of homogeneity of the mixture may locally result in excessive degradation of the polymer.

A process for pelletisation of propylene polymer in the presence of a free radical generator is also known, e.g. from U.S. Pat. No. 4 451 589, according to which process all of this free radical generator is added to the polymer first of all and the pelletisation is then carried out under such conditions that only a part of this free radcal generator decomposes and degrades the polymer, the remaining part subsequently coming into action during the conversion of the pellets into finished articles. However, the pelletisation stage and the conversion of the pellets into finished articles are carried out under conditions which are so different from each other that in practice it is difficult to choose a free radical generator which can be suitable for both at the same time. It has been found, furthermore, that this pelletisation process is difficult to control with good reproducibility on an industrial scale because only a part of the total quantity of the free radical generator initially employed comes into action during the pelletisation and that a slight change in the pelletisation conditions may give rise to relatively large fluctuations in the melt index of the degraded polymer of which the pellets consist. Moreover, this process means that at the end of the pelletisation stage the pellets must be subjected to a quenching operation the purpose of which is to arrest the polymer degradation instantaneously at the desired level. Possible variations in the conditions which enable this quenching operation to be carried out can also increase the risks of irreproducibility of this process. The lack of reproducibility in the quality of the pellets manufactured in this manner is a particular problem for the converter who is generally someone other than the manufacturer of the polymers and pellets. The converter must constantly modify and adapt the extruder settings depending on the quality of the pellets to be converted. This irreproducibility in the quality of the pellets is all the more awkward when the intention is to obtain polymers of very high melt index which have a tendency to be sticky.

An improved process for the manufacture of pellets of propylene homopolymers or copolymers in the presence of free radical generators has now been found which process overcomes or at least mitigates the above mentioned problems. In particular, it is possible to manufacture with excellent reproducibility pellets consisting essentially of a propylene homopolymer or copolymer, possessing a relatively high melt index. Moreover, these non-sticky pellets are designed so that the melt index of the polymer of which these pellets consist should increase considerably during the conversion of the pellets into finished articles, this conversion being advantageously carried out in an extruder of a type in common use, particularly without the addition of a complementary quantity of a free radical generator to the polymer. One of the objectives of the present invention is to simplify the process of manufacture of the pellets, which may particularly comprise a stage of cooling the pellets under normal conditions, and thus avoid the conditions of a quenching operation at the end of pelletisation. Another object of the present invention is to prepare pellets of a quality which is as constant as possible. Such reproducibility in the manufacture of the pellets advantageously reduces the need for the converter to constantly change the settings of the extruders intended to convert the pellets into finished articles. A further objective of the present invention is to manufacture equally well pellets which comprise propylene homopolymer of high crystallinity and pellets which comprise propylene copolymer of low crystallinity.

The subject of the present invention is therefore a process for the manufacture of pellets of propylene homopolymer or of a copolymer of propylene with at least one other alpha-olefin, according to which process the homopolymer or the copolymer is subject to a thermo-mechanical degradation treatment in the presence of free radical generators so as to increase the melt index of the homopolymer or of the copolymer and to obtain tractable, non-sticky pellets characterized in that:

(a) two free radical generators, G1 and G2, are added to the homopolymer or to the copolymer, each in a quantity of between 0.001% and 2% by weight relative to the homopolymer or to the copolymer, the half-life of G2 being at least 20 times longer than that of G1 at the pelletisation temperature, and that (b) the homopolymer or the copolymer to which addition has thus been made is pelletised under conditions such that at least 80% by eight of the quantity of G2 initially added and not more than 20% by weight of the quantity of G1 initially added remain intact in the pellets manufactured and available for a subsequent decomposition during a conversion of the said pellets into finished articles.

The pelletisation process according to the present invention is suitable for a wide variety of propylene homopolymers or copolymers having a crystallinity which may vary within a wide range. It is possible, in particular, to pelletise a propylene homopolymer which has a degree of crystallinity of between 30 and 50%, as determined by differential scanning calorimetry (DSC) analysis, a melt index ($MI_{2.16}$) of between 0.05 and 10 g/10 minutes, as measured at 190° C. under a 2.16 kg load, and a molecular weight distribution of between 3.5 and 6, as determined by gel permeation chromatography (GPC) and calculated as the relationship between the weight average molecular weight ($\overline{Mw}$) and the number average molecular weight ($\overline{Mn}$). It is also possible to pelletise a random copolymer of propylene with not more than 10 mol % of ethylene and/or of an alpha-olefin containing from 4 to 10 carbon atoms, this copolymer having a degree of crystallinity of between 25 and 45% as determined by DSC, a melt index ($MI_{2.16}$) of between 0.05 and 10 g/10 minutes and a molecular weight distribution ($\overline{Mw}/\overline{Mn}$) of between 3.5 and 6, as determined by GPC. The process of the invention also makes it possible to pelletise a block copolymer consisting partly of homopolypropylene and partly of a copolymer of ethylene and propylene, the weight relationship of the homopoly-propylene part to the copolymer part being between 1/1 and 20/1 and the weight content of units derived from ethylene being between 2 and 25%. This block copolymer generally has a degree of crystallinity of between 25 and 45% as determined by DSC and a melt index ($MI_{2.16}$) of between 0.05 and 10 g/10 minutes.

Furthermore, the process of the invention may be applied to an elastomeric copolymer of ethylene and propylene which has a weight content of units derived from propylene of between approximately 30 and 65%, and to an elastomeric terpolymer of ethylene, propylene and diene, which has weight contents of units derived from propylene and of units derived from the diene of between approximately 25 and 70% and between approximately 0.5 and 5% respectively. This elastomeric copolymer or terpolymer has a degree of crystallinity of less than approximately 10%, as determined by DSC, and a melt index ($MI_{2.16}$) of between 0.05 and 5 g/10 minutes.

It is also possible to pelletise a relatively amorphous copolymer of propylene, 1-butene and, optionally, ethylene, which has weight contents of units derived from 1-butene and of units derived from ethylene of between 10 and 40% and between 0 and 8%, respectively. This relatively amorphous copolymer has a degree of crystallinity of between 10 and 35%, as determined by DSC, and a melt index ($MI_{2.16}$) of between 0.05 and 10 g/10 minutes.

It is also possible to pelletise an essentially amorphous copolymer of ethylene, propylene and, optionally one or more alpha-olefins containing from 4 to 10 carbon atoms, which has molar contents of units derived from ethylene and of units derived from the alpha-olefins containing from 4 to 10 carbon atoms of between 40 and 60% and between 0 and 10% respectively. This essentially amorphous copolymer has a degree of crystallinity of less than 5% and preferably less than 3%, as determined by DSC, and an intrinsic viscosity greater than 8 dl/g, preferably greater than 10 dl/g, measured in decalin at 135° C.

Two free radical generators, G1 and G2, whose half-lives are sufficiently different at the pelletisation temperature must be added to the propylene homopolymer or copolymer employed in the process according to the present invention. In particular, at the pelletisation temperature the half-life of G2, corresponding to the time necessary for the decomposition of one half of the quantity of this free medical generator initially employed, must be at least 20 times longer, and preferably at least 100 times longer, than that of G1 at the same temperature. In practice, the free radical generator G1 is chosen so that not more than 20% by weight, and preferably not more than 10% by weight, of the quantity of G1 initially employed remains intact in the pellets after their manufacture. Similarly, the free radical generator G2 is chosen so that at least 80% by weight, and preferably at least 90% by weight, of the quantity of G2 initially employed remains intact in the propylene homopolymer or copolymer after the pelletisation. More particularly, it is preferable to choose G2 so that it is virtually completely decomposed during the subsequent conversion of the pellets into finished articles. It obviously follows, in this case, that the free radical generator G1 is completely decomposed after the conversion of these pellets into finished articles.

The free radical generators employed in the process of the present invention may be chosen from organic peroxides or hydroperoxides, organic compounds containing an azo functional group, and sterically hindered and thermally unstable hydrocarbon compounds. They may be in the form of a liquid or of a solid, in solution, for example, in water or in a liquid hydrocarbon, or else associated with an inert solid carrier. The free radical generator G1 may consist of one or more compounds chosen, for example, from di-tert-butylperoxide, 1,1-di-tert-butylperoxy-3,3,5-trimethylcyclohexane, 1,1-di-tert-butylperoxy-cyclohexane, tert-butylperoxy isopropyl carbonate, tert-butylperoxy-3,5,5-trimethylcyclohexane, tert-butylperoxy 3,5,5-trimethylhexanoate, 2,2-di-tert-butylperoxybutane and tert-butylperoxy acetate. The free radical generator G2 may also consist of one or more compounds chosen, for example, from diisopropylbenzene hydroperoxide, cumene hydroperoxide, tert-butyl hydroperoxide, 2,2-azobis(2,4-dimethylvaleronitrile), azobisisobutyrontrile,2,2'-azobis(2,2'-acetoxypropane), 3,4-dimethyl-3,4-diphenylhexane and 2,3-dimethyl-2,3-diphenylbutane.

For each of the generators G1 and G2, the quantity of free radical generator to be added to the propylene homopolymer or copolymer is between 0.001 and 2% by weight, preferably between 0.005% and 1% by weight based on the homopolymer or copolymer. This quantity obviously depends on the nature of the free radical generators employed and on the desired melt index of the homopolymer or copolymer obtained after pelletisation and ultimately after conversion of the pellets into finished articles. In particular, it is advisable to employ a quantity of G1 which is not too high, to avoid producing sticky pellets having a tendency to agglomerate. Such pellets would be difficult to feed into extruders. With this objective in mind, it is preferable to determine beforehand, for each type of homopolymer or copolymer to be pelleted, the maximum value of the melt index which must not be exceeded during the pelletisation and above which there is a risk of producing intractable sticky pellets. This maximum value of the melt index is generally proportionally lower for a homopolymer or a copolymer, the lower also is its degree of crystallinity. It is advisable, nevertheless, to add a sufficient quantity of G1 to the homopolymer or copolymer to prevent crosslinking phenomena arising and opposing the desired increase in the melt index of the polymer during the pelletisation, particularly when this polymer is a copolymer of propylene and of at least 10 mol % of ethylene. The quantity of G2 to be added to the homopolymer or copolymer depends on the desired increase in the melt index of the polymer during the conversion of the granulates into finished articles.

According to the invention, the free radical generators G1 and G2 are added to the homopolymer or to the copolymer to be pelletised together or separately and optionally at the same time as other additives or fillers, such as neutralizing agents, stabilizers, antioxidants, silica, talc, carbon black, colorants and, optionally, other polymers. These free radical generators are generally employed as such or in the form of a solution in water or in a liquid hydrocarbon, or else in the form of a masterbatch consisting of a polymer or copolymer identical with or different from that to be pelletised, which has a high content of free radical generator.

The free radical generators G1 and G2 are added to the homopolymer or copolymer before or during the pelletisation. They are preferably suitably blended with the homopolymer or copolymer before the beginning of their decomposition, in particular at a temperature below their decomposition temperature. The decomposition temperature is a characteristic of each peroxide and is the temperature below which the peroxide does not decompose by homolytic cleavage of the O—O bond to form free radicals. The homopolymer or the copolymer employed may be in the form of pellets but are preferably in the form of a powder. The blending of the free radical generators with the homopolymer or copolymer may be carried out with the aid of a powder blender or of a kneader of a common type. It is important that the homogenization of the mixture should be carried out as completely as possible, because any insufficient homogenization would after pelletisation result in polymers which are excessively degraded locally and to pellets which may be sticky. It may also be desirable to carry out the homogenization of the blend of free radical generators G1 and G2 and of the homopolymer or copolymer by kneading in the molten state, with the aid, for example, of an extruder of a commonly used type, at a temperature below the decomposition temperature of the free radical generators.

It is also possible to add the free radical generators, G1 and G2 directly to the homopolymer or copolymer during the pelletisation. In this case, they may be immediately introduced into the extruder intended to pelletise the homopolymer or copolymer, in particular into a mixing zone of this machine where the temperature is kept below the decomposition temperatures of these free radical generators. In this way, the homogenization of the blend may be carried out suitably before entering into a zone of the machine where the temperature is above the decomposition temperature of the free radical generator G1. According to this process, it is also possible to introduce the free radical generator G2 separately from G1 into a zone of the extruder where G1 may already have started to decompose, on condition that G2 has the time to blend suitably with the polymer before eventually it also partially decomposes.

The homopolymer or copolymer to which free radical generators G1 and G2 have thus been added can be pelletised using a conventional extruder typically at a pelletisation temperature which is between 160° C. and 240° C., for a time of between 10 and 200 seconds. The pelletisation temperature is the average temperature, above the decomposition temperature, to which the polymer is subjected during the formation of the pellets. Thus, when an extruder is used in the pelletisation process, the pelletisation temperature is the average temperature to which the polymer is subjected in the pelletisation zone of the extruder. The pelletisation zone is that part of the extruder extending from the end of the mixing zone to the die; the mixing zone being maintained at a temperature below the decomposition temperatures of the peroxides. The pelletisation temperature is therefore the average temperature in the extruder and die above the lowest decomposition temperature of the peroxides. According to the invention, the free radical generators G1 and G2 are characterized by half-lives which are sufficiently different at the pelletisation temperature. In particular, the half-life of G1 at this temperature is appreciably shorter than the average residence time of the homopolymer or copolymer in the pelletisation zone of the extruder, while the half-life of G2 is considerably longer.

In order to obtain pellets of a constant quality in a reproducible manner it is essential that the pelletisation conditions be such that most of G2, if not all of G2 remains intact in the pellets which are manufactured and that most of G1, if not all of G1, is decomposed by the end of pelletisation. In practice, it has been found that it is sufficient for at least 80%, and preferably at least 90%, by weight of G2 and not more than 20%, and preferably not more than 10%, by weight of G1 to remain intact in the pellets, in order to obtain non-sticky pellets with excellent reproducibility. Moreover, it has been found that the pellets thus manufactured, containing a free radical generator such as G2, capable of decomposing at relatively high temperatures, introduce little risk of being degraded during their storage before their conversion.

The quantities of the peroxides remaining intact in the pellets can be readily calculated using the half-lives of the peroxides at the average temperature above the decomposition temperature and the time for which the polymer was subjected to this temperature. For example, the amount of peroxide remaining intact can be calculated from the half-lives of the peroxides at the pelletisation temperature and the mean residence time of the polymer in the pelletisation zone of the pellisation extruder.

According to the process of the invention, it is possible to manufacture non-sticky pellets consisting essentially of propylene homopolymer or copolymer of a relatively high melt index. Thus, when a propylene homopolymer or copolymer which has a degree of crystallinity equal to or higher than 25%, as determined by DSC, is involved, the melt index ($MI_{2.16}$) may be between 5 and 40 g/10 minutes. On the other hand, when pellets consisting essentially of an amorphous or elastomeric propylene copolymer which has a degree of crystallinity of less than 25%, preferably less than 10%, as determined by DSC, are involved, the melt index ($MI_{2.16}$) does not generally exceed 20 g/10 minutes, preferably 10 g/10 minutes.

The pellets manufactured according to the process of the invention may subsequently be converted into finished articles using known processes and equipment e.g. an extruder of a common type, at a temperature which is generally between approximately 250° and 350° C. During this conversion, the melt index ($MI_{2.16}$) of the homopolymer or copolymer increases to a very high value which generally lies between 20 and 1,000 g/10 minutes and can even exceed 1,000 g/10 minutes, particularly when the propylene homopolymer or copolymer initially employed has a degree of crystallinity equal to or higher than 25% and preferably equal to or higher than 30%, as determined by DSC. Furthermore, the melt index ($MI_{2.16}$) may increase during this conversion to a value which generally does not exceed 100 g/10 minutes, when the propylene copolymer initially employed is essentially elastomeric or amorphous in nature, with a degree of crystallinity of less than 25%, preferably less than 10% as determined by DSC.

Measurements of the melt indices ($MI_{2.16}$), ($MI_{8.5}$) and ($MI_{21.6}$)

The melt index ($MI_{2.16}$) of a polymer is measured at 190° C. under a load of 2.16 kg, according to the ASTM method D - 1238 - condition E.

The melt index ($MI_{8.5}$) of a polymer is measured at 190° C. under a load of 8.5 kg.

The melt index ($MI_{21.6}$) of a polymer is measured at 190° C. under a load of 21.6 kg, according to the ASTM method D-1238 condition F.

Measurement of the degree of crystallinity by DSC

This measurement is carried out with the aid of a Perkin-Elmer (model DSC4) scanning differential micro-calorimeter. The enthalpy diagram of a 5 mg specimen of a propylene homopolymer or copolymer is recorded as it is heated up to 200° C. at 16° C./minute. The specimen is previously subjected to a heat treatment consisting of heating to 200° C. at 16° C./minute, followed by being kept at this temperature for 20 minutes and by cooling to 50° C. at 16° C./minute. The area of the endotherm peak recorded during the heating is proportional to the enthalpy of melting of the homopolymer or copolymer. The degree of crystallinity is calculated from this enthalpy, it being known that the enthalpy is equal to 220 J/g for a 100% crystalline propylene polymer.

The following examples, which do not imply any limitation, illustrate the present invention.

EXAMPLE 1

A propylene homopolymer which had the following characteristics was employed:
melt index ($MI_{2.16}$): 0.25 g/10 minutes;
weight content of polypropylene soluble in boiling n-heptane: 4.1%;
degree of crystallinity, determined by DSC: 45%;
molecular weight distribution ($\overline{Mw}/\overline{Mn}$) determined by GPC: 4.6.

The free radical generator of type G1 which was employed was di-tert-butyl peroxide, sold by Akzo Chemie (Netherlands) under the trade name "Trigonox B" (Triganox is a trade mark) which has a half-life of approximately 20 seconds at 205° C. Furthermore, the free radical generator of type G2 which was employed was tert-butyl hydroperoxide, in the form of a 70% strength by weight solution in water, this solution being sold by Akzo Chemie (Netherlands) under the trade name "Trigonox AW70": the half-life of tert-butyl hydroperoxide is approximately 40 minutes at 205° C.

The pelletisation was carried out with the aid of a Werner-Pfleiderer 53 extruder comprising a twin screw 28 mm in diameter and 840 mm in length, rotating at a rate of 200 revolutions per minute, with a 60% torque.

Into the feed hopper of this machine were introduced:
Propylene homopolymer, in powder form,
0.065% by weight, based on the polypropylene, of an antioxidant sold by Ciba-Geigy (Switzerland) under the trade name "Irganox 1010" (Inganox is a trade mark) and
0.1% by weight of di-tert-butyl peroxide, sold under the trade name "Trigonox B".

Furthermore, "Trigonox AW70" was introduced separately in a proportion of 0.15% by weight of tertbutyl hydroperoxide relative to the polypropylene, into a feed zone of the extruder where the temperature was in the region of 100° C.

The pelletisation was carried out at a rate of 15 kg/hour, at a temperature of 205° C., with a mean residence time in the extruder of 100 seconds. Under these conditions non-sticky pellets were obtained, consisting essentially of a propylene homopolymer which had a melt index ($MI_{2.16}$) of 9.8 g/10 minutes. It was calculated that 97% by weight of the total quantity of tert-butyl hydroperoxide employed and 4% by weight of the total quantity of di-tert-butyl peroxide employed remained intact in these pellets.

These pellets were then converted into continuous filaments with the aid of a Brabender extruder comprising a screw 19 mm in diameter and 475 mm in length, rotating at a rate of 50 revolutions per minute and fitted with a die with 8 holes 0.4 mm in diameter. The conversion into filaments was carried out at a rate of 12.5 g/minute, at a temperature of 305° C., with a mean residence time in the extruder of 120 seconds. Propylene homopolymer filaments which had a melt index ($MI_{2.16}$) of 190 g/10 minutes were thus obtained. It was calculated that the free radical generators in these filaments had disappeared.

EXAMPLE 2

A copolymer of propylene and 1-butene which had the following characteristics was employed:
weight content of units derived from 1-butene: 15%;
melt index ($MI_{2.16}$): 0.08 g/10 minutes;
degree of crystallinity, determined by DSC: 30%;
molecular weight distribution (Mw/Mn) determined by GPC: 4.5.

The free radical generator of type G1 which was employed was 2,5-dimethyl-2,5-di(tert-butylperoxy)hexane (DMDTBPH), sold by Vanderbilt (Netherlands) under the trade name "Varox" (Varox is a trade mark) which has a half-life of approximately 15 seconds at 205° C. Furthermore, the free radical generator of type G2 which was employed was tert-butyl hydroperoxide, sold by Akzo Chemie (Netherlands) under the trade name "Trigonox AW70"; the half-life of tertbutyl hydroperoxide is approximately 40 minutes at 205° C.

The pelletisation was carried out with the aid of a Werner-Pfleiderer 53 extruder identical with that employed in Example 1. Into the feed hopper of this machine were introduced:
the copolymer of propylene and 1-butene, in powder form,
0.025% by weight of calcium stearate, based on this copolymer,
0.07% weight, based on this copolymer, of an antioxidant sold by Ciba-Geigy (Switzerland) under the trade name "Irganox 1010".
0.025% by weight, based on this copolymer, of a stabilizer sold by Ciba-Geigy (Switzerland) under the trade name "Irgafos PEPQ" (Irgafos is a trade mark)
0.2% by weight, based on this copolymer, of a micronized silica sold by Grace (U.S.) under the trade name "Syloid 244" (Syloid is a trade mark) and
0.1% by weight, based on this copolymer, of DMDTBPH, sold under the trade name "Varox".

Furthermore, "Trigonox AW70" was introduced separately in a proportion of 0.15% by weight of tertbutyl hydroperoxide, based on the copolymer, into a heat zone of the extruder where the temperature was in the region of 100° C.

The pelletisation was carried out under conditions which were otherwise identical with those described in Example 1. Non-sticky pellets were obtained, consisting essentially of a copolymer of propylene and 1-butene which had a melt index ($MI_{2.16}$) of 8.8 g/10 minutes. It was calculated that 97% by weight of the total quantity of tert-butyl hydroperoxide employed and 3% by weight of the total quantity of DMDTBPH employed remained intact in these pellets.

The pellets were subsequently converted into continuous filaments with the aid of a Brabender extruder identical with that employed in Example 1 and under conditions which were also identical. Filaments of a copolymer of propylene and 1-butene which had a melt index ($MI_{2.16}$) of 28 g/10 minutes were thus obtained. It was calculated that the free radical generators in these filaments had disappeared.

EXAMPLE 3

An amorphous copolymer of propylene, ethylene and 4-methyl-1-pentene, which has the following characteristics, was employed:
molar content of units derived from ethylen: 46%,
molar content of units derived from 4-methyl-1-pentene: 1.3%;
melt index ($MI_{21.6}$): 0.5 g/10 minutes;
degree of crystallinity determined by DSC: less than 1%.

The free radical generator of type G1 which was employed was 2,5-dimethyl-2,5-di(tert-butylperoxy)-hexane (DMDTBPH), sold by Vanderbilt (Netherlands) under the trade name "Varox". Furthermore, the free radical generator of type G2 which was employed was tert-butyl hydroperoxide, sold by Akzo Chemie (Netherlands) under the trade name "Trigonox AW70".

The pelletisation was carried out with the aid of a Werner-Pfleiderer 53 extruder identical with that employed in Example 1. Into the feed hopper of this machine were introduced:
The copolymer of propylene, ethylene and 4-methyl-1-pentene in powder form,
0.3% by weight, based on this copolymer, of calcium stearate,
0.07% by weight, based on this copolymer, of an antioxidant sold by Ciba-Geigy (Switzerland) under the trade name "Irganox 1010",
0.025% by weight, based on this copolymer, of a stabilizer sold by Ciba-Geigy (Switzerland) under the trade name "Irgafos PEPQ",
0.2% by weight, based on this copolymer, of a micronized silica sold by Grace (U.S.) under the trade name "Syloid 244", and
0.5% by weight, based on this copolymer, of DMDTBPH, sold under the trade name "Varox".

Furthermore, "Trigonox AW70" was introduced separately in a proportion of 0.15% by weight of tertbutyl hydroperoxide, based on the copolymer, into a feed zone of the extruder where the temperature was in the region of 100° C.

The pelletisation was carried out under conditions which were otherwise identical with those described in Example 1. Non-sticky pellets were obtained, consisting essentially of a copolymer of propylene, ethylene and 4-methyl-1-pentene, which had a melt index of ($MI_{8.5}$) of 0.6 g/10 minutes. It was calculated that 97% by weight of the total quantity of tert-butyl hydroperoxide employed and 3% by weight of the total quantity of DMDTBPH employed remained intact in these pellets.

These pellets were subsequently converted into continuous filaments with the aid of a Brabender extruder identical with that employed in Example 1 and under conditions which were also identical. Filaments of a copolymer of propylene, ethylene and 4-methyl-1-pentene which had a melt index ($MI_{8.5}$) of 36 g/10 minutes were thus obtained. It was calculated that the free radical generators in these filaments had disappeared.

We claim:

1. A process for the manufacture of pellets of propylene homopolymer or of a copolymer of propylene with at least one other alpha-olefin, according to which process the homopolymer or the copolymer is subjected to a thermomechanical degradation treatment in the presence of free radical generator so as to increase the melt index of the homopolymer or copolymer and to obtain tractable, non-sticky pellets, characterized in that:
   (a) two free radical generators G1 and G2 are added to the homopolymer or copolymer, each in a quantity of between 0.001% and 2% by weight relative to the homopolymer or copolymer, the quantity of G1 being such that crosslinking phenomena during the pelletisation are avoided and the half-life of G2 being at least 20 times longer than that of G1 at the pelletisation temperature, and in that (b) the homopolymer or the copolymer to which addition has thus been made is pelletised under conditions such that at least 80% by weight of the quantity of G2 initially added and not more than 20% by weight of the quantity of G1 initially added remain intact in the pellets manufactured and available for a subsequent decomposition during a conversion of the said pellets into finished articles.

2. A process according to claim 1, characterized in that the free radical generator G2 has a half-life at least 100 times longer than that of G1 at the pelletisation temperature.

3. A process according to claim 1, characterized in that the free radical generators G1 and G2 are chosen from organic peroxides or hydroperoxides, organic compounds containing an azo functional group and sterically hinderred and thermally unstable hydrocarbon compounds.

4. A process according to claim 1, characterized in that at least two free radical generators G1 and G2 are added to the homopolymer or copolymer, each in a quantity of between 0.005% and 1% by weight, based on the homopolymer or copolymer.

5. A process according to claim 1, characterized in that the homopolymer or copolymer to which addition has thus been made is pelletised under conditions such that at least 90% by weight of the quantity of G2 initially added and not more than 10% by weight of the quantity of G1 initially added remain intact in the granules manufactured.

6. A process according to claim 1, characterized in that the homopolymer or copolymer to which addition has thus been made is pelletised in an extruder at a temperature of between 160° and 240° C., for a time of between 10 and 200 seconds.

7. A process according to claim 1, characterized in that the free radical generators G1 and G2 are added to the homopolymer or copolymer before or during the granulation.

8. Pellets of propylene homopolymer or of a copolymer of propylene with at least one other alpha-olefin which are prepared by a process according to claim 1.

9. A process for producing articles of propylene homopolymer or of a copolymer of propylene with at least one other alpha-olefin, according to which process the homopolymer or the copolymer is subjected to a thermomechanical degradation treatment in the presence of free radical generator so as to increase the melt index of the homopolymer or copolymer, characterized in that:

(a) two free radical generators G1 and G2 are added to the homopolymer or copolymer, each in a quantity of between 0.001% and 2% by weight relative to the homopolymer or copolymer, the quantity of G1 being such that crosslinking phenomena during the pelletisation are avoided and the half-life of G2 being at least 20 times longer than that of G1 at the pelletisation temperature, and in that (b) the homopolymer or the copolymer to which addition has thus been made is pelletised under conditions such that at least 80% by weight of the quantity of G2 initially added and not more than 20% by weight of the quantity of G1 initially added remain intact in the pellets manufactured and available for a subsequent decomposition during a conversion of the said pellets into finished articles, and (c) fabricating articles from the pellets under conditions such that substantially all of the free radical generators G1 and G2 are decomposed.

10. An article produced according to the process claimed in claim 9.

* * * * *

UNITED STATES PATENT AND TRADEMARK OFFICE
CERTIFICATE OF CORRECTION

PATENT NO. : 4,897,452

DATED : January 30, 1990

INVENTOR(S) : Bernard Berrier, et al

It is certified that error appears in the above-identified patent and that said Letters Patent is hereby corrected as shown below:

Col. 9, line 68, correct spelling of word "ethylene"

Signed and Sealed this

Twenty-sixth Day of February, 1991

*Attest:*

HARRY F. MANBECK, JR.

*Attesting Officer*     *Commissioner of Patents and Trademarks*